United States Patent [19]
Terry

[11] 3,900,583
[45] Aug. 19, 1975

[54] CONTOURED BELT COATING METHOD
[75] Inventor: David R. Terry, Wayne, Pa.
[73] Assignee: American Home Products Corporation, New York, N.Y.
[22] Filed: Aug. 6, 1973
[21] Appl. No.: 385,789

Related U.S. Application Data
[63] Continuation-in-part of Ser. No. 170,534, Aug. 10, 1971, abandoned.

[52] U.S. Cl............... 427/3; 118/417
[51] Int. Cl............ B05c 3/04; B05c 3/08
[58] Field of Search........... 117/100 A, 106 R, 109, 117/104; 118/13, 19, 417, DIG. 2, 259, 33; 259/182, 72

[56] References Cited
UNITED STATES PATENTS

| | | | |
|---|---|---|---|
| 2,308,420 | 1/1943 | Hoopes | 118/19 UX |
| 3,167,035 | 1/1965 | Benson | 118/19 X |
| 3,256,111 | 6/1966 | Singiser | 117/100 A X |
| 3,383,236 | 5/1968 | Brindamour | 117/100 A X |
| 3,383,237 | 5/1968 | Tuerck | 117/100 A |

Primary Examiner—Ralph Husack
Assistant Examiner—Shrive P. Beck
Attorney, Agent, or Firm—Richard K. Jackson

[57] ABSTRACT

An apparatus for coating pills, tablets, capsules, and the like, comprising a continuous conveyor belt means disposed about and supported by at least three rollers. The upper surface of said conveyor belt means forms a concave region sufficiently large to retain and tumble the objects being coated while the conveyor moves in an inclined path around said rollers. At the sides of the concave region of said conveyor belt means in which the tablets or pills tumble in a bed during operation, there is provided side retainer plates to prevent loss of material under treatment in a lateral direction to the direction of the conveyor belt drive. The concave depth of the conveyor belt may be changed by altering the distance between the rollers forming either the base or the heighth of the triangle with screw means attached to said rollers and co-operatively engaged with screw threads in the apparatus support frame. Discharge of the pills from the tumbling belt coater is effected by pivoting the entire assembly in the direction of conveyor belt travel about the axis of the base roller.

1 Claim, 3 Drawing Figures

CONTOURED BELT COATING METHOD

RELATED APPLICATION

This application is a continuation-in-part of Ser. No. 170,534, filed Aug. 10, 1971, now abandoned.

BACKGROUND OF THE INVENTION

Conventionally, the coating of pills, tablets, capsules and the like is performed in spherical pans or drums, usually made of copper or stainless steel and either end-mounted on a shaft for rotational drive or adapted for surface drive. The objects to be coated are placed in the pan or drum, rotation is begun and the coating material is added as desired. Hot drying air is often directed at the bed of tumbling tablets or pills via a conduit passing into the rotating vessel through a small opening. After completion of the coating operation, the pan or drum dryer is stopped and hand emptied by the operator through the vessel opening. In order to achieve an economical batch size in these pan or drum coaters, the opening through which they are loaded, unloaded and through which the coating is applied, is very small.

In a recent development, a peripheral rotary drum surface was devised with holes in it to permit exhausting the pan through its surface at a point where the mass of tumbling particles form during rotation of the drum. This side venting technique is disclosed in U.S. Pat. No. 3,573,966. Although the perforated drum plate eliminated the need for an exhaust duct through the drum opening and improved the drying efficiency of the drum, the perforations tend to erode the tablets or pills more rapidly than a smooth drum surface and especially wear away a tablet edge before a protective coating thickness can be applied. The problem of loading and unloading the perforated drum dryer remains essentially the same as that of the prior art coating apparatuses. Likewise, the side vented drum retains a fixed internal contour as did previous coating vessels.

The same coating device is employed in the pharmaceutical industry to dry solid material by removing water or organic solvents in de-dusting and polishing operations. Hence, it is to be understood that when reference to coating is made throughout this specification, it is intended to embrace drying, de-dusting and polishing as well. Likewise, the coating apparatus may be employed to treat pills, tablets, capsules and similar fabricated solid objects. Hence, throughout the remaining portion of this specification reference will be made to tablets for the sake of simplicity with the full intent of embracing within the scope of the term tablet, other forms of solids such as pills, capsules, and the like.

BRIEF DESCRIPTION OF THE INVENTION

In accordance with this invention there is provided a contoured belt tumble coater which comprises:

a. a frame support adapted to retain at least three axle shafts upon which plural rollers are disposed internally to said frame support, the centers of said shafts forming a triangle, the entire frame being pivotable about the rear base shaft;

b. disposed about said plural rollers, a continuous belt conveyor means forming a contoured upper surface sufficiently concave to prevent longitudinal spillage and to tumble solid objects placed on its surface while said conveyor means moves about said rollers;

c. plural fixed side retainer plates adapted to be moved laterally in the region of the contoured upper surface of said continuous belt;

d. plural idler sprocket wheels disposed at each side and within the contoured region of said continuous belt conveyor external to said fixed side retainer plates and moveably attached to said frame support in such manner that their fixed positions dictate the contoured path followed by said continuous belt about said rollers; and e. drive means for said belt conveyor.

Another aspect of this invention resides in the process of coating tablets with the apparatus of this invention, which comprises a. placing a charge of tablets on the contoured, concave portion of the flexible belt conveyor between two fixed side retainer plates, b. driving said belt conveyor in the direction of an inclined plane created by plural idler sprocket wheels disposed at each side and within the contoured region of said continuous belt conveyor, c. spraying a coating material upon the tumbling bed of tablets, while simultaneously exhausting volatile matter, dust and particle fines while drying said coating material as a film on said tablets and drawing additional coating material in conjunction with dry air through the tumbling tablet bed, and d. discharging the coated tablets from said belt conveyor by decreasing the slope of said inclined plane sufficiently to permit said tablets to exit the region of contour of said belt conveyor in the direction of the original belt conveyor travel.

The continuous belt supported by the rollers, is longer than the distance around the rollers, the extra length being taken up by plural idler sprocket wheels and fixed side retainer plates in the region between the upper rollers, thereby forming a pocket or trough inclined in the direction of the belt movement to contain and tumble small objects such as tablets. The belt may be solid, woven or a screen mesh, as long as it is flexible enough to bend around the rollers in one direction and reverse its bend to form the pocket or trough between the upper rollers. Solid belt buffers are especially useful in polishing and buffing operations whereas foraminous belts are preferred in coating operations. The belt is driven by a variable speed drive that moves the belt at speeds up to about 250 feet per minute.

The removal of coated tablets from the coating apparatus of this invention is greatly simplified in comparison with the procedures followed with rotating pan or drum coaters, in that the tablets may be discharged from the belt conveyor by reversing the direction of travel of the belt or alternatively by pivoting the entire frame support about the axis of the base roller, thereby discharging tablets from the belt without reversing the direction of the belt.

A typical coating material used in tablet coating processes may be either a suspension or solution of materials such as hydroxymethyl methylcellulose, ethylcellulose, dyes and di-octyl phthalate in volatile solvents such as methanol or dichloromethane. The coating suspension is applied to the tumbling bed of tablets either by ladle or by spray, the latter technique being preferred.

The apparatus of this invention is constructed from materials suitable for use in the pharmaceutical industry. The belt conveyor may be constructed from any material which is inert toward the treating and wash solution and not subject to air oxidation at temperatures conventionally employed in coating tablets. Thus fabrics made from either natural or man-made fibers as well as metal wire may be used as the belt conveyor. Of especial interest are woven mesh stainless steel belt conveyors because of their inertness, smooth surface, long wear life and relatively high ratio of open area and strength when compared to organic polymer fiber based fabrics.

The woven mesh belt conveyor is easily washed after the coating operation by spraying the wash solvent through the foraminous belt or by releasing the tension on the belt by moving one roller toward the base roller to allow the belt to droop into a vessel containing the wash solvent.

DETAILED DESCRIPTION OF THE INVENTION

The invention, its objects and advantages are further detailed in the following description of the drawing and the operation and use of the apparatus there depicted in which.

Figure 1:
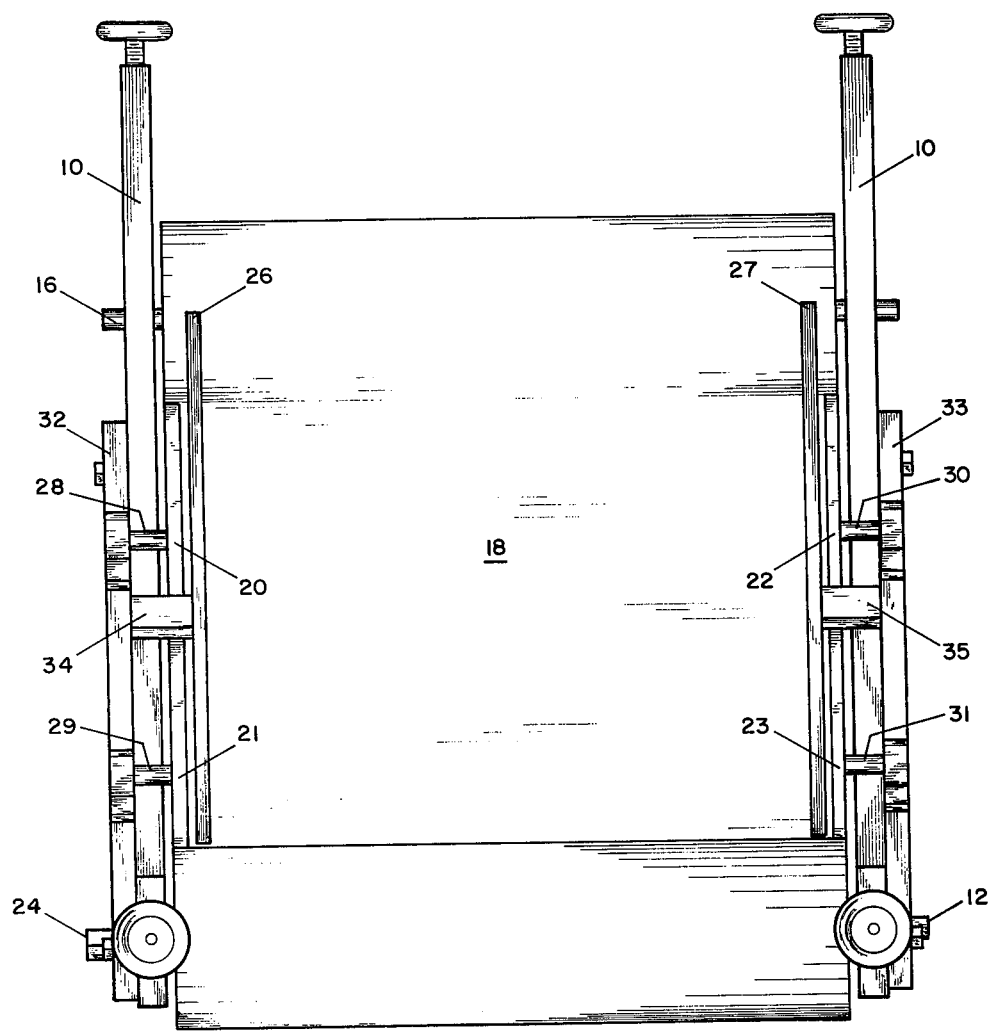
FIG. 1 is a front view of the apparatus of this invention.

With reference to the drawings, a frame housing 10 provides support for the axles of rollers 12, 14 and 16. Flexible conveyor belt 18 passes around rollers 12, 14 and 16, and is sufficiently long to form a concave pocket below side plates 26 and 27. Side plates 26 and 27 rest above or skid on belt 18, as belt 18 travels, thereby forming retainer walls for tablets tumbling in the belt pocket. Idler sprocket wheels 20, 21, 22 and 23 rotate in the concave pocket of belt 18 and are fixed to frame support members 32 and 33 via axles 28, 29, 30 and 31. The location of the idler sprocket wheels in relation to belt 18, may be best observed by reference to FIG. 2. Exhaust plenum 36 is situated opposite the region of foraminous belt 18 in which the mass of tumbling tablets appear. When a solid belt conveyor is employed, the exhaust plenum 38 may be placed in one or preferably both retainer side plates next to the tablet bed as shown in FIG. 3. The side retainer walls 26 and 27 are attached to the adjustable frame support members 32 and 33 via adjustable attachment means 34 and 35.

Any known means for driving belt 18 may be employed in the instant invention. In FIG. 1, drive means 24 rotates roller 14, (not shown) thereby activating belt 18 which is driven by friction or sprockets on roller 14. Thus, as depicted base roller 12 and roller 16 are idle rollers serving merely to direct the belt.

In practice, to obtain a more positive drive action, a chain driven belt may be employed, in which case each of the rollers 12, 14 and 16 are sprocket rollers, rear base roller 14 serving effectively as the drive means.

Furthermore, with reference to the retainer side plates, in addition to the fixed type plate depicted in FIG's. 1 and 2, belting with attached guard plate edges serves equally as well to prevent lateral movement of tablets from the belt pocket formed by idler sprocket wheels 20, 21, 22 and 23.

Figure 2:
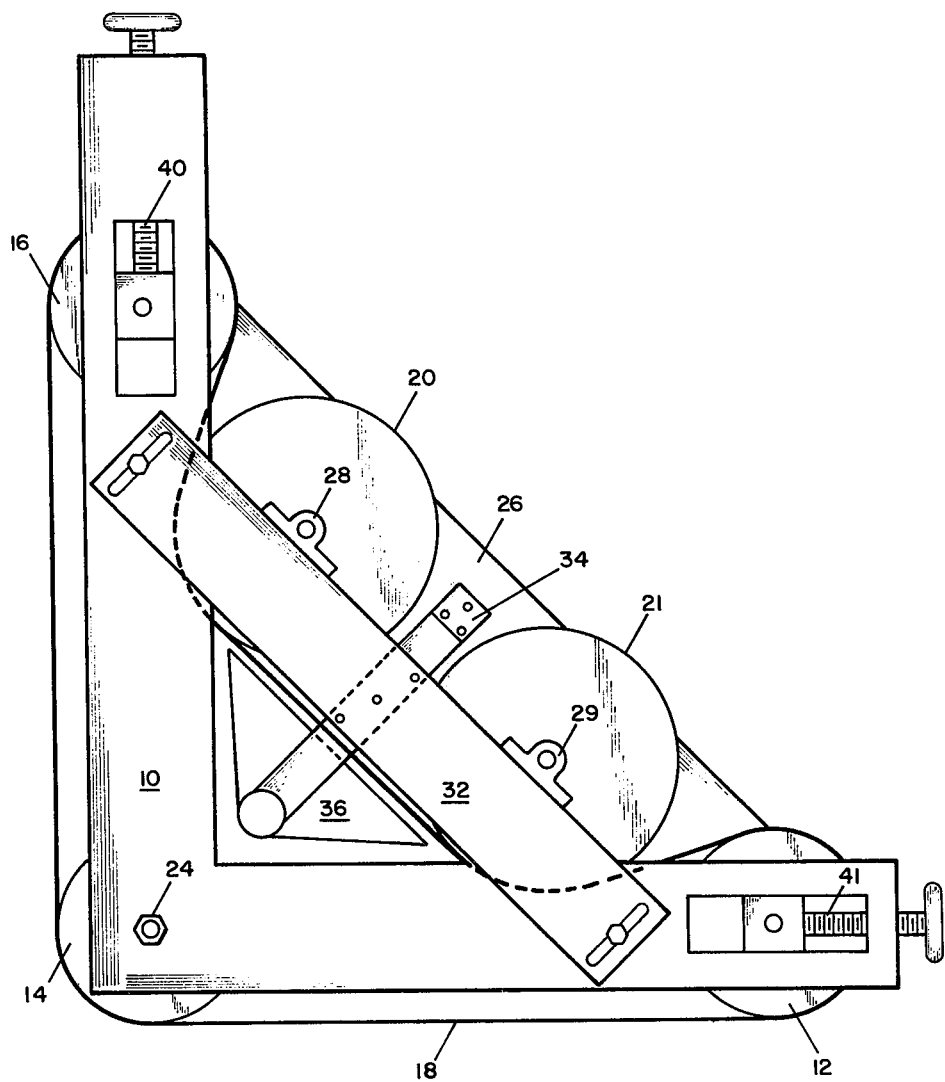
FIG. 2 is a side view of the apparatus of this invention.
Figure 3:
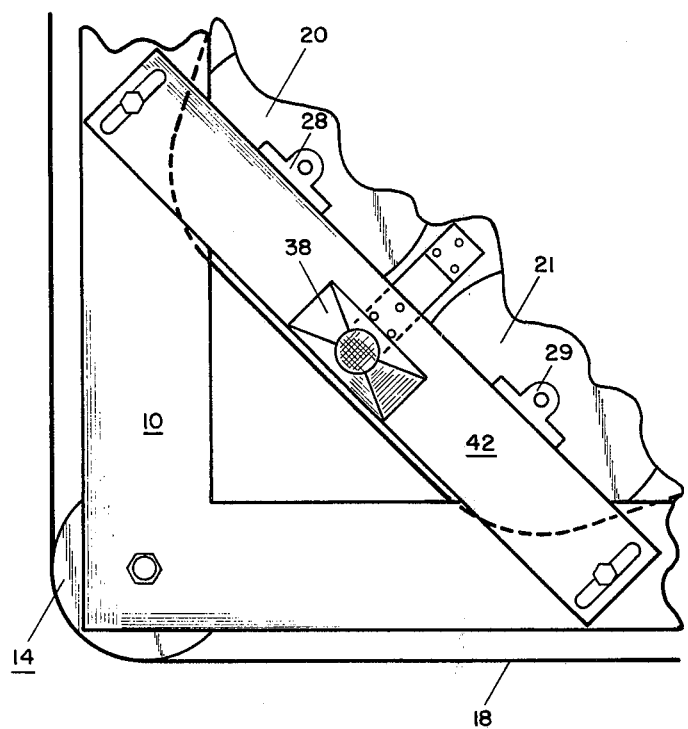
FIG. 3 illustrates an exhaust vented side plate modification of FIG. 1.

In FIG. 2, bolts 40 and 41 permit adjustment of the size of the belt pocket. Thus, by increasing the distance from either roller 12 or 16 from base roller 14, the concavity of belt 18 is reduced from roller 16 to roller 12, the fixed side plate retainer 26 being forced outward with idler wheels 20 and 21 and their bearings 28 and 29 on frame support member 32. In this manner, a single machine may be altered to operate with a small or large charge of tablets, extending its use from laboratory to pilot plant and ultimately to commercial production facilities. Furthermore, the side plate retainer 26 alone or in conjunction with it's counterpart 27 on the opposite side of the conveyor belt means, may be adjusted toward the center of belt 18 by adjustment means 34 and 35 narrow the trough in which the tablets tumble. Thus, a change in volume of tablets charged to the contoured belt does not effect the tumbling motion due to the ability to alter the bed depth, width, contour and slope.

FIG. 3 illustrates a modification in positioning the exhaust plenum for use of a solid belt conveyor means rather than a foraminous belt. In essence, the side plate retainer 26 is adapted to provide a screened aperture 38 to which the exhaust system is attached. The side vent aperture may be provided in one side plate or both side plates to provide for a dual manifold exhuast system. This modification is especially desirable in polishing operations in which a substantially nonporous mat of polyurethane, polyethylene or polypropylene is employed as a liner for a continuous belt buffer. The strap bearing support 42 is modified to permit the exhaust manifold to pass between idler sprocket wheels 20 and 21 into connection with aperture 38.

Although, for the sake of simplicity, the figures illustrate the invention with three rollers, the centers of which form a triangle, it is to be understood that the invention embraces the presence of any number of rollers, the critical feature residing in the use of a flexible, foraminous or solid, conveyor means which is adjustably contoured by at least four idler wheels to form a pocket in which the conveyor moves in an inclined path to retain and tumble a bed of tablets.

With the apparatus of this invention, the configuration or contour of the tablet bed in the belt pocket can be quickly and easily changed by replacing or moving the retaining side plates. This allows varying batch sizes to be made without varying the depth of the bed, which is an important feature in scaling up from pilot plant or laboratory facilities to actual production. Furthermore, the width of the tablet bed can be made to conform to the coating spray pattern by adjustment of the retainer side plates.

The configuration or contour of the belt pocket may be changed as desired by adjusting the positions of the idler sprocket wheels 20, 21, 22 and 23. For example, to reduce the force applied in tumbling soft tablets, the depth of the bed may be reduced. Thus, loss of material by abrasion is lessened by the weight factor attributable to the reduced depth of the tablet bed. The shallower bed also increases the frequency of appearance of any one tablet on the surface where it receives coating material. Likewise, the loss of material by abrasion may be controlled to a certain degree by the contour of the belt pocket. Thus, the shape of the belt pocket may be adjusted to conform to the most desirable shape for any given tablet surface curvature.

Where loss of tablet material by abrasion presents a significant problem, it is preferred to utilize a woven stainless steel wire belt conveyor, which provides sufficient flexibility to pass around the guide rollers and reverse its direction to form the belt pocket. Such woven wire belts present only rounded edges to the tablets resting on them as opposed to the perforations of side vented drums, Thus, the apparatus of this invention reduces tablet erosion in the coating operation.

An especially significant advantage residing in the apparatus of this invention and in its operation is that of easy access to the tablet tumbling region of the belt pocket for loading, inspection of the objects being coated, alignment and maintainance of the coating spray application nozzles, and cleaning of the unit after completion of the coating operation. Since unloading of the belt conveyor of this invention may be easily effected by pivoting the entire device about base roller 14 sufficiently to permit discharge over the top of roller 16 during operation, the problems of access for unloading through restricted door areas of drum type coater vessels is completely avoided.

With the apparatus of this invention, the circulation of drying air is greatly increased through the bed of objects being coated. The open areas of the foraminous belt permit a high effective open area which increases the flow of air through the bed of tablets and reduces the power requirement of the exhaust system. The effective open area of woven wire conveyor belting is as high as 70 percent whereas a perforated drum type coater is limited generally to about 50 percent open area for structural and manufacturing reasons.

In some instances, from about 30 to about 40 percent of the solids in a coating spray solution or suspension are lost during the coating operation using a side vented drum due to abrasion. Considerably less material is lost with the belt conveyor of this invention. Economically, the belt conveyor type tablet tumbler of this invention is decidedly advantageous both from the view of fabrication costs and direct labor costs of operation due to the ease of loading and unloading.

What is claimed is:

1. A process for coating pharmaceutical tablets which comprises:
   a. placing a charge of tablets on the upper surface and in the concave region of a contoured, concave, flexible, belt conveyor between two side retainer plates;
   b. driving said belt conveyor in the direction of an inclined plane created by plural idler sprocket wheels disposed at each side and within the contoured region of said continuous belt conveyor, thereby forming a tumbling bed of said tablets;
   c. spraying a coating material upon said tumbling bed of tablets, while simultaneously exhausting volatile matter, dust and particle fines while drying said coating material as a film on said tablets and drawing additional coating material in conjunction with dry air through the tumbling tablet bed; and
   d. discharging the coated tablets from said belt conveyor by decreasing the slope of said inclined plane sufficiently to permit said tablets to exit the region of contour of said belt conveyor in the direction of the original belt conveyor travel.

* * * * *